J. C. WRIGHT.
Nut-Lock.

No. 167,967. Patented Sept. 21, 1875.

Witnesses
Thomas P. Bewley
George C. Hetzel

Inventor
Joseph C. Wright
Stephen Ustick Attorney

UNITED STATES PATENT OFFICE.

JOSEPH C. WRIGHT, OF MONOCACY FURNACE, ASSIGNOR OF ONE-HALF HIS RIGHT TO JOHN BARCLAY HACKER, OF PHILADELPHIA, PENNSYLVANIA, AND JESSE M. COOK.

IMPROVEMENT IN NUT-LOCKS.

Specification forming part of Letters Patent No. 167,967, dated September 21, 1875; application filed May 14, 1875.

*To all whom it may concern:*

Be it known that I, JOSEPH C. WRIGHT, of Monocacy Furnace, in the county of Berks and State of Pennsylvania, have invented an Improvement in Nut-Locks, of which the following is a specification:

My invention consists of the combination, with a washer and bolt-nut, of a spring, which partly surrounds the nut, and is provided with a ratchet on its inner curved surface, which engages with a corner or side of the nut when the latter is screwed up to its place. The spring is free to turn on a pivot, to disconnect the ratchet from the nut for tightening the same. The free end of the spring has a hook which engages with a pin for holding the ratchet in connection with the nut.

Figure 1:
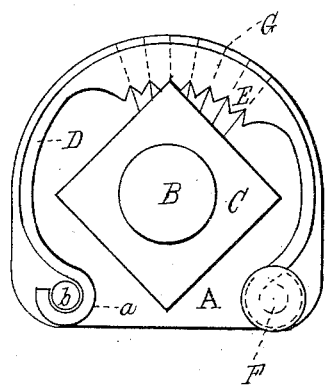
Figure 2:
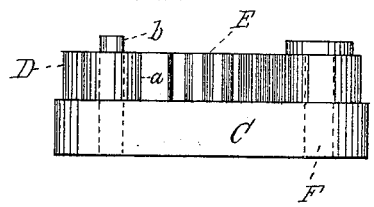

In the accompanying drawings, Figure 1 is a plan view of my improved nut-lock. Fig. 2 is an edge view of the washer B and spring D, provided with the ratchet E.

Like letters of reference in both figures indicate the same parts.

A is the washer, B a bolt, C a nut, and D a spring, provided with a ratchet, E, which partly encircles the nut. The spring is connected at one end with the pivot F, upon which it turns freely for disengaging the ratchet from the nut for screwing up the latter. The other end of the spring has a hook, *a*, which is connected with the pin *b* that projects from the face of the washer when the ratchet is connected with the nut to hold it securely therewith. The washer has a scale, G, to either line of which one corner of the nut is placed for an easy connection of the ratchet E. When the nut is to be tightened the ratchet is very quickly disengaged from it by disconnecting the hook *a* of the spring D from the pin *b*. And the same may be very quickly re-engaged with the nut by bringing the spring into its former connection. Instead of making the ratchet and spring in a single piece, they may be made separately and riveted together.

I claim as my invention—

The encircling spring D, provided with the ratchet E, in combination with the washer A and nut C, substantially as and for the purpose set forth.

JOSEPH C. WRIGHT.

Witnesses:
 THOMAS J. BEWLEY,
 STEPHEN USTICK.